Nov. 15, 1955 M. D. WELSH 2,723,709
INFANTS' CAR SEAT
Filed July 18, 1952 3 Sheets-Sheet 1
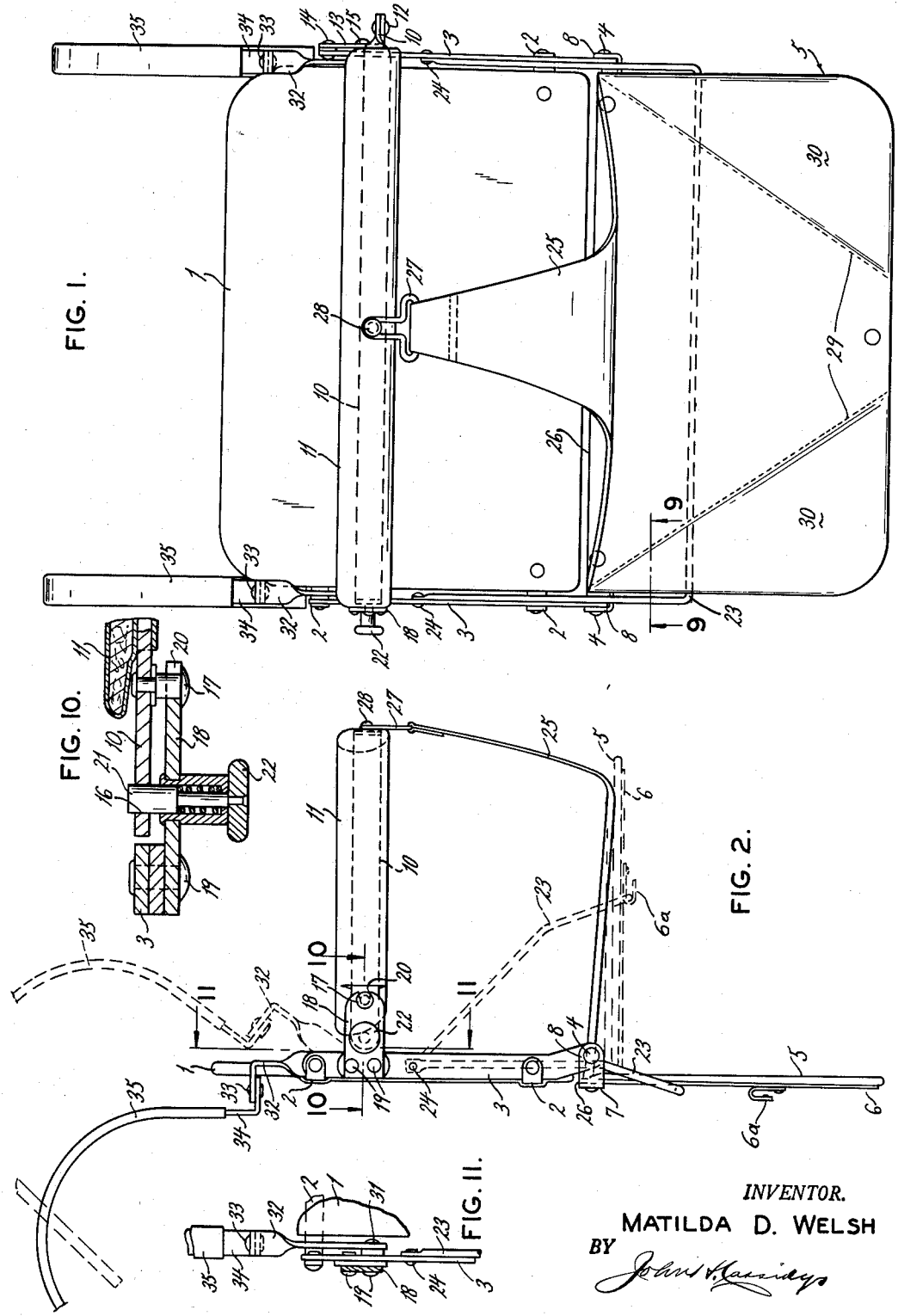
INVENTOR.
MATILDA D. WELSH
BY
ATTORNEY Nov. 15, 1955    M. D. WELSH    2,723,709
INFANTS' CAR SEAT
Filed July 18, 1952    3 Sheets-Sheet 2
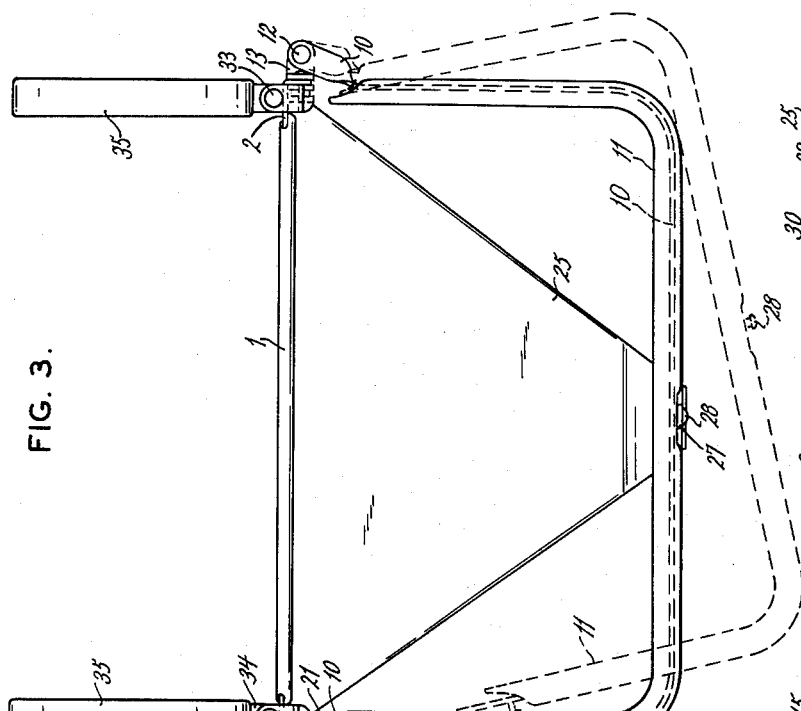
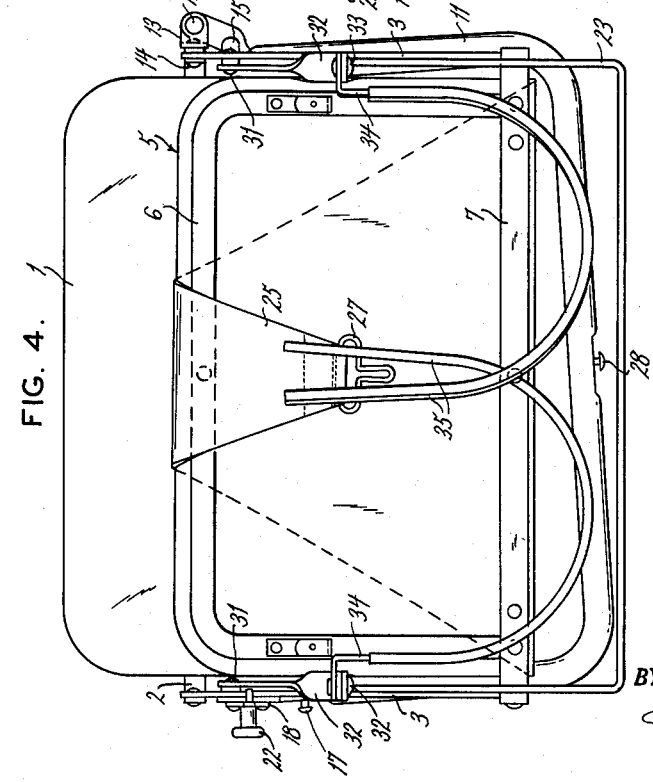
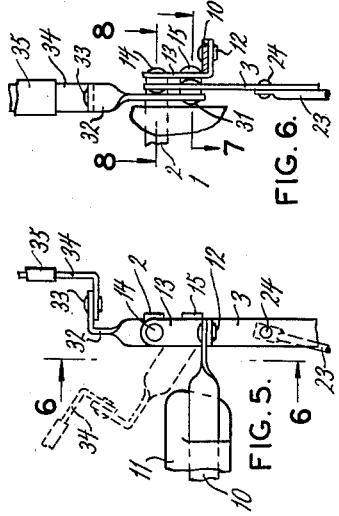
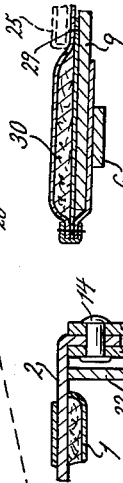
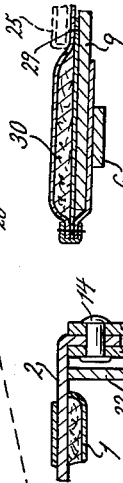
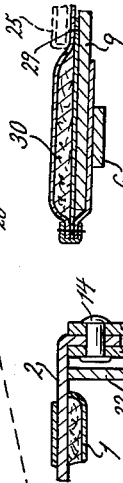
INVENTOR.
MATILDA D. WELSH
BY
ATTORNEY

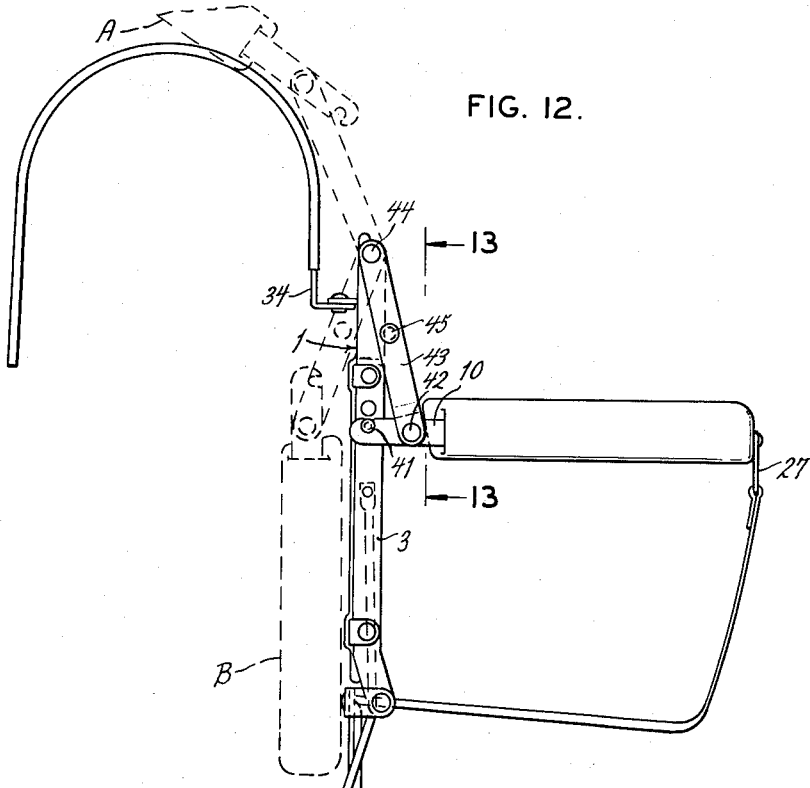
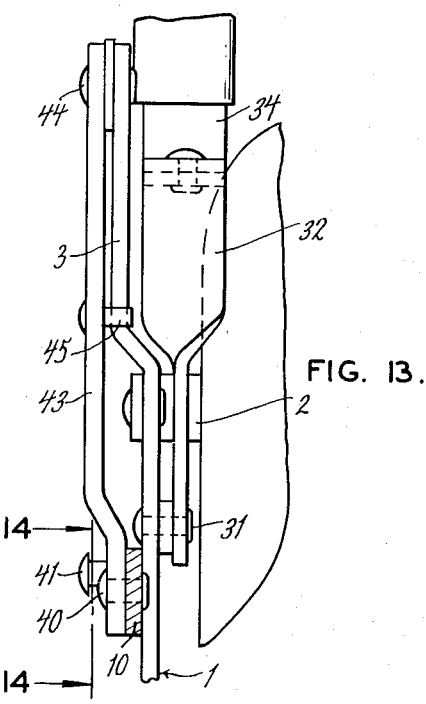
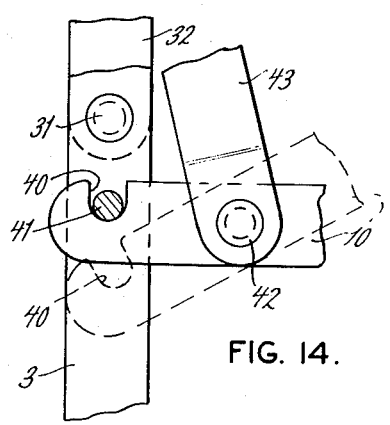

United States Patent Office 2,723,709
Patented Nov. 15, 1955

2,723,709

INFANTS' CAR SEAT

Matilda D. Welsh, Ladue, Mo.

Application July 18, 1952, Serial No. 299,553

5 Claims. (Cl. 155—11)

This invention pertains to a baby seat such as may be used in an automobile, being hung on the back of the car seat. It provides a seat for the child which may be folded down to depending position so as to permit the child to stand on the car seat. An arm-rest bow extends around the child in either position. A flexible, triangular crotch strap overlies the seat when the latter is in its normal position so that the child sits upon and astride of the crotch strap. Said strap is secured to the rear of the seat and to the front of said arm-rest bow so that when the seat is lowered to permit the child to stand, he is still astride the crotch strap. This avoids the danger of his slipping down out of the arm-rest bow and falling off of the car seat. The entire structure is collapsible into a small flat package.

A preferred embodiment of this invention is illustrated in the accompanying drawings, in which Figure 1 is a front elevation of a baby seat embodying this invention, shown with the seat in depending position, Fig. 2 is a side view of Fig. 1, Fig. 3 is a plan view of the same, Fig. 4 is a plan view showing the structure folded, Fig. 5 is a detail side view, looking at the right side of Fig. 1, Fig. 6 is a section on line 6—6 of Fig. 5, Fig. 7 is an enlarged section on line 7—7 of Fig. 6, Fig. 8 is an enlarged section on line 8—8 of Fig. 6, Fig. 9 is an enlarged section on line 9—9 of Fig. 1, Fig. 10 is an enlarged section on line 10—10 of Fig. 2, Fig. 11 is a section on line 11—11 of Fig. 2.

Fig. 12 is a side view illustrating another embodiment of this invention.

Fig. 13 is an enlarged detailed view as seen from line 13—13 of Fig. 12.

Fig. 14 is a detailed section on line 14—14 of Fig. 13.

Referring to the drawing, 1 designates a back frame of any suitable design having a cross member 2 and side members 3 of strap iron or the like. Pivoted to the side members 3 at 4 is a seat indicated generally at 5. This seat has a U-shaped frame member 6, of strap iron or the like, extending around the front portion thereof, and a rear cross member 7 having up-turned ears 8 to receive the pivots 4. A panel 9 (Fig. 9) of card board or the like is attached to said frame members to provide a seat for the child. An arm-rest bow 10 of strap iron or the like is padded with upholstery 11 of any suitable kind. The bow 10 is pivoted at 12 on a bracket 13 for horizontal movement. Said bracket 13 is pivoted at 14 to one of the side members 3 for vertical movement. A stop 15 on the member 3 prevents downward movement of the bow 10 on the pivot 14 from its position in Fig. 1 but permits such movement upward, rearward, and then downward in rear of the back frame. The other end of the bow 10 is perforated at 16 near its end and is provided with a headed pin 17 spaced a short distance from said perforation. A bracket 18 rigidly attached to the side member 3 as by rivets 19 has a notch 20 open at its end adapted to receive the pin 17. A spring-loaded pin 21 having a manipulating head 22 is mounted in the bracket 18 as shown in Fig. 10 in position to enter the perforation 16 when the pin 17 is seated in the notch 20. This provides a cantilever support in addition to that provided by the stop 15 to hold the bow 10 in extended position above the seat 5 as shown in Fig. 2. A U-shaped hanger 23, pivoted at 24 to the side members 3, extends around under the seat 5. Hook elements 6a, only one of which appears in Fig. 2, are secured to the arms of the member 6 in position to receive the hanger 23 when the seat 5 is in extended position, as shown in dotted lines in Fig. 2.

In order to provide a safety support for the child when the seat 5 is down in the position shown in solid lines in Fig. 2, a crotch strap 25 is provided. This is of flexible material such as fabric, so that the child may stand astride it on the car seat. It is generally triangular in shape being secured at the base of the triangle to the rear edge 26 of the seat 5 along the cross member 7 as shown in Figs. 1 and 2. At the apex portion of the triangle it is provided with a shackle 27 engageable with a headed pin 28 on the front of the bow 10. The seat portion of the crotch strap 25 may be padded and when the seat 5 is raised to the dotted line position of Fig. 2, this portion overlies the seat 5, covering the central area thereof outlined by the dotted lines 29 in Fig. 1. That portion of the seat 5 lying outside of said dotted lines may also be padded as indicated at 30 (see Fig. 9) so that in this position the entire seating area is padded.

Pivoted at 31 on each of the side members 3 for vertical movement thereon, is an angle bracket 32. Pivoted at 33 on the bracket 32 for lateral movement thereon, is a supporting hook 34 adapted to be hooked over the back of the car seat to support the entire structure thereon. These hooks may be padded in any suitable manner, as by covering them with rubber tubing 35.

With the hooks 34 over the back of the car seat and the seat 5 in the dotted line position of Fig. 2, the child may be seated on the seat 5 astride the crotch strap 25. This provides a comfortable riding seat. The bow 10 provides an arm rest. When the child wants to stand the seat 5 may be lowered to vertical position. It will be noted that the bends in the side arms of the hanger 23 (Fig. 2) permit these arms to clear the member 7 and permit the seat to hang vertically. In this position the crotch strap is supported on the frame 1 at its rear edge by the member 7 and at its front end on the bow 10, and the child may stand but is still astride the crotch strap which provides a guard to prevent him from slipping down off the car seat. He may rest by sitting on the crotch strap and can stand up again at will.

When the device is not in use it may be folded as shown in Fig. 4. To fold it, the shackle 27 is unhooked from the pin 28 and the seat 5 is folded up on its pivots 4 against the back 1. The pin 21 is withdrawn from the perforation 16 after which the pin 17 may be withdrawn from the notch 20, thereby freeing this end of the bow 10. Said bow may then be swung outward on the pivot 12, as indicated in dotted lines in Fig. 3, far enough to permit folding the hooks 34. These are folded by first swinging them forward and downward on the pivots 31, then laterally on the pivots 33 to the position shown in Fig. 4. The bow 10 is then swung upward, rearward, and downward on the pivot 14 to folded position behind the back 1 as shown in Fig. 4.

In the embodiment of Figs. 12 to 14 inclusive, the arm rest bow 10 is supported on the frame 1 as shown in Fig. 12. The ends of the bow 10, only one of which appears in the drawings, are each provided with a notch 40 so as to form a hook at that end adapted for engagement with a stop pin 41, one of which is fixed on each of the side members 3 of the frame 1. Pivoted on a pin 42 on the arm 10 a short distance from the notch 40, is a link 43. The other end of the link 43 is pivoted at 44 to the upper end of an extension of the side bar 3. As may be seen from Fig. 12, this provides a cantilever support for the bow 10. The link 43 may be provided with a stop pin 45 adapted for engagement with the member 3 as shown in Fig. 13 to keep the link 43 from swinging back too far so as to make it easier to engage the notch 40 with the pin 41.

In this embodiment the arm rest bow 10 is in the position of Fig. 12 when in use. When it is desired to remove the child, he may be lifted out in the ordinary manner, or while he remains standing on the seat, the shackle 27 may be disconnected after which the bow 10 is raised so as to unhook the notches 40 from the pins 41. The arm rest may then be swung upward on the link 43, the latter pivoting at 44. When the arm rest reaches this top position, the length of the link 43 is added to the depth of the arm rest so that the latter extends upward far enough to clear the baby's head. At the end of such movement it may take the dotted line position indicated at A in Fig. 12 with the bow 10 resting on the back of the car seat. When the device is to be folded for storage, it may be swung on the pivots 44 to the rear of the frame 1 to the position indicated in dotted lines at B in Fig. 12. The other parts are folded as already described in connection with Fig. 4.

Various changes may be made in the details of construction, within the scope of the appended claims, without departing from the spirit of this invention. Parts of the invention may be used without the whole and improvements may be added while retaining some or all of the advantages of the invention.

I claim:

1. A baby seat, comprising, a back frame, suspension means for supporting said frame on the back of a seat such as a car seat, a seat hinged on said frame for movement to horizontally extending position and to vertically depending position, releasable means adjustable to support said seat in its horizontal position, an arm-rest bow on said frame above said seat, and a safety support for the child when standing on the car seat, said support overlying said seat and being supported on said frame along its rear edge and on the front of said bow.

2. A baby seat, comprising, a back frame, suspension means for supporting said frame on the back of a seat such as a car seat, a seat hinged on said frame for movement to horizontally extending position and to vertically depending position, releasable means adjustable to support said seat in its horizontal position, an arm-rest bow on said frame above said seat, and a triangular safety support for the child when standing overlying said seat and secured along the base of the triangle to the rear edge of said seat and at the apex thereof to the front of said bow whereby the child may stand astride said safety support with his legs free and unconfined.

3. A baby seat, comprising, a back frame, suspension means for supporting said frame on the back of a seat such as a car seat, a seat hinged on said frame for movement to horizontally extending position and to vertically depending position, releasable means adjustable to support said seat in its horizontal position, an arm-rest bow hinged at each end to said back frame above said seat thereby permitting upward swinging movement of the bow, a stop for limiting the downward swinging movement of the bow to a horizontal position, and a safety support for the child when standing overlying said seat and secured to said frame at the rear of said seat and the front of said bow.

4. A baby seat comprising, a back frame, suspension means for supporting said frame on the back of a seat such as a car seat, an arm-rest bow mounted on said frame for movement to extended and folded positions, and a generally triangular flexible safety support positioned to be straddled by the child while standing on the car seat secured at the base of the triangle to said frame and releasably secured at the apex portion thereof to said bow whereby the child may stand astride said safety support with his legs free and unconfined.

5. A baby seat comprising, a back frame, a seat pivotally supported thereon for folding to collapsed position upon said frame, a hanger for supporting said frame on the back of a seat such as a car seat, a double-pivot attachment of said hanger to said frame for folding movement thereof forward, downward and laterally to collapsed position upon said folded seat, an arm-rest bow pivoted at one end thereof on said frame for lateral movement to clear the folding movement of said hanger and for upward, rearward, and downward movement to collapsed position at the rear of said back frame, and supporting means on said frame releasably engageable by the other end of said bow adapted to lock the same in extended position above said seat.

References Cited in the file of this patent

UNITED STATES PATENTS

| 1,205,384 | Peck | Nov. 21, 1916 |
| 2,509,103 | Lewis et al. | May 23, 1950 |
| 2,533,527 | Soltis | Dec. 12, 1950 |
| 2,571,823 | Bonk | Oct. 16, 1951 |
| 2,635,676 | Graffius et al. | Apr. 21, 1953 |
| 2,675,858 | Cotter | Apr. 20, 1954 |

FOREIGN PATENTS

| 336,271 | Great Britain | Oct. 9, 1930 |